A. E. KRICK.
HUMIDITY CONTROL.
APPLICATION FILED JAN. 10, 1919.
1,315,517.
Patented Sept. 9, 1919.
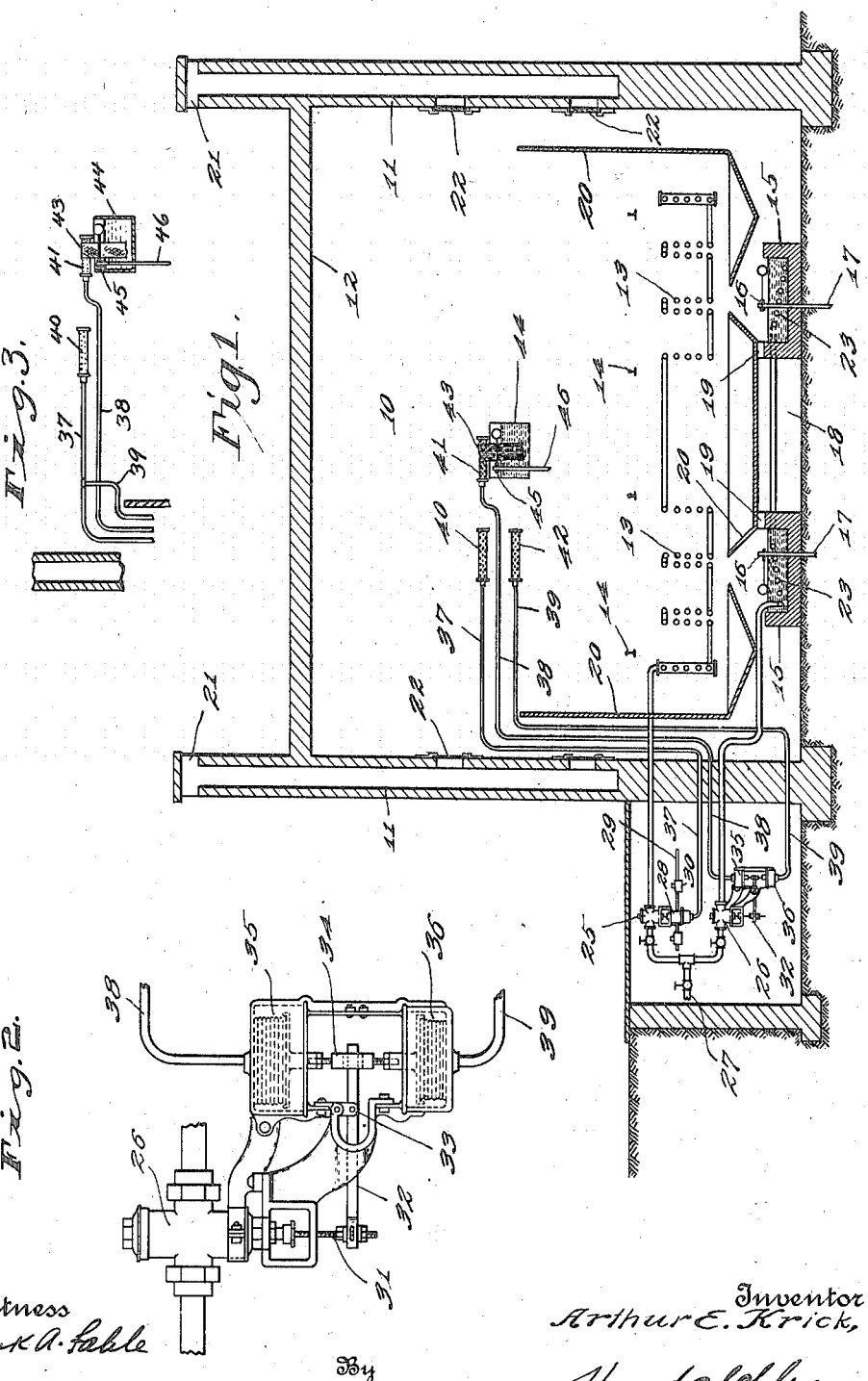
Witness
Frank A. Fable
Inventor
Arthur E. Krick,
By
Hood & Johly.
Attorneys

UNITED STATES PATENT OFFICE.

ARTHUR E. KRICK, OF INDIANAPOLIS, INDIANA, ASSIGNOR, BY DIRECT AND MESNE ASSIGNMENTS, TO THE HUMIDITY CONTROL COMPANY, OF INDIANAPOLIS, INDIANA, A CORPORATION OF INDIANA.

HUMIDITY CONTROL.

1,315,517. Specification of Letters Patent. Patented Sept. 9, 1919.

Application filed January 10, 1919. Serial No. 270,523.

*To all whom it may concern:*

Be it known that I, ARTHUR E. KRICK, a citizen of the United States, residing at Indianapolis, in the county of Marion and State of Indiana, have invented a new and useful Humidity Control, of which the following is a specification.

It is the object of my invention to control automatically the wet-bulb and dry-bulb temperatures of a dry kiln or other inclosed space, so that the dry-bulb temperature and the difference between the dry-bulb and wet-bulb temperatures may be automatically maintained, and so that in case the dry-bulb temperature does vary the wet-bulb temperature will follow it so as to maintain substantially constant the difference between such two temperatures and so maintain the relative humidity sufficiently nearly constant for any usual variations in temperature.

In attaining this result, I automatically control the heat supplied to the kiln or inclosure by a dry-bulb thermostat, which acts on a regulating device (such as a steam valve) to vary the heat supplied in accordance with the temperature of the kiln or inclosure; and I automatically control the amount of moisture taken up by the air in the kiln or inclosure by a wet-bulb thermostat and a dry-bulb thermostat which act in opposition on a regulating device (such as a steam valve controlling the temperature of water in a water pan in the kiln or inclosure) to vary the amount of moisture which is taken up by such air. By adjustment of the first regulating device, any desired temperature may be maintained; and by adjustment of the second regulating device, with relation to the adjustment of the first, any desired difference between the wet-bulb and dry-bulb temperatures may be obtained, the wet-bulb and dry-bulb thermostats which act on said second regulating device tending to operate it to decrease and increase respectively the amount of moisture taken up by the air so that the difference between the wet-bulb and dry-bulb temperature may be maintained constant even though for any reason the dry-bulb temperature as regulated by the first regulating device departs from the desired constant value.

The accompanying drawing illustrates my invention.

Figure 1 is a vertical section through a kiln embodying my invention, showing the control mechanism rather diagrammatically; Fig. 2 is an enlarged view of the humidification steam valve and its operating mechanism; and Fig. 3 is a fragmentary view showing a modified arrangement whereby the two thermostats 40 and 42 are combined.

The drying chamber 10 of the kiln has any suitable inclosing side walls 11 and top 12. Steam coils 13 are located near the bottom of the chamber 10, for heating the air in such inclosure, these coils conveniently being arranged below the level of tracks 14 which support the material to be dried. Below the coils 13 are water troughs 15, in which a constant water level is maintained by float valves 16 controlling the water supplied from any suitable source through pipes 17. Between the two water troughs 15 is an air duct 18, leading from the atmosphere and opening into the space directly above the water in the troughs 15 by suitable apertures 19, so as to supply fresh air. Suitable baffles 20 are provided, for directing the flow of air upward from above the water trough 15 to the air-heating coils 13, whence the air passes through the drying chamber 10 and down between the side walls 11 and the baffles 20 back to the space above the water troughs 15, so that a continuous air circulation is produced. Air may be allowed to escape from the kiln through chimneys 21 in the side walls, the entrances to these chimneys being controlled by dampers 22, preferably located in the walls 11 near the vertical baffles 20, some above and some below the upper edges of such vertical baffles. By adjusting the dampers 22 the amount of air which escapes through the chimneys 21 and the corresponding amount of fresh air which is drawn in through the air duct 18 and the apertures 19 are controlled. Steam coils 23 are immersed in the water in the water troughs 15, for heating such water to promote the evaporation thereof into the air which passes thereover; the amount of such evaporation depending upon the temperature to which the water is heated. Thus the air is heated by the steam coils 13, which set up the air circulation; and the air is humidified by passing over the water troughs 15, the amount of humidification depending upon the temperature of the water in such troughs.

In order to control automatically the dry-bulb and wet-bulb temperatures of the air within the drying chamber 10, and the difference between such temperatures, in response to variations in these conditions of the air, the steam supply to the coils 13 is by way of a pressure-operated valve 25 and that to the coils 23 is by way of a similar pressure-operated valve 26; the steam supply comes from any suitable source, which may be a common source for both coils, by way of a steam pipe 27 and suitable shut-off valves and, if necessary, pressure-reducing valves. The pressure-operated valves 25 and 26 are of any suitable type. The valve 25 is shown (only diagrammatically) as having a pressure chamber the movable member of which is connected to the valve stem and tends to close the valve, acting in opposition to a lever 29 on which is an adjustable weight 30 which tends to open the valve and by the adjustment of which the temperature at which the valve operates may be controlled. The valve 26, of which the operating mechanism is shown in detail in Fig. 2, has a threaded valve stem 31, which is connected by a pin and slot connection to one end of a lever 32 hung on a link 33, the valve stem being provided with suitable adjusting nuts for adjusting its relation to such lever; and the other end of the lever 32 projects through a slot in a member 34 which has adjustable connections to the movable members of two pressure chambers 35 and 36, which act in opposition on such lever 32 and through it on the valve stem 31, the pressure in the upper chamber 35 tending to close the valve 26 and that in the lower chamber 36 tending to open such valve. The pressure chamber 28 of the valve 25 and the pressure chambers 35 and 36 of the valve 26 are respectively connected by suitable tubes 37, 38, and 39 to three thermostatic elements 40, 41, and 42 located within the drying chamber 10 so as to be responsive to the air conditions therein. The thermostatic elements 40 and 42 are dry-bulb elements, so that they are both responsive to the dry-bulb temperature of the air in such drying chamber; in consequence, though for simplicity these two thermostatic elements 40 and 42 are shown in Fig. 1 as separate elements, such separateness is not essential, as indicated in Fig. 2, where a single thermostatic element 40' is shown connected to both pipes 37 and 39. The thermostatic element 41, however, is a wet-bulb element, being covered by a fabric or wicking 43 which dips into the water in a water tank 44 in which a constant water level is maintained by a float valve 45 controlling the supply of water to such tank from any suitable source through a supply pipe 46; so that such thermostatic element 41 is responsive to the wet-bulb temperature of the air in the drying chamber, which wet-bulb temperature is less than the dry-bulb temperature (to which the thermostatic elements 40 and 42 are responsive) by an amount depending upon how far the relative humidity of the air in the drying chamber 10 is below 100%, the difference between the wet-bulb and dry-bulb temperatures being zero when the relative humidity is 100%, all in accordance with the well-understood laws of psychrometry. The thermostatic elements 40, 41, and 42 are illustrated as of the fluid-containing type, in which the fluid pressure varies upon change in temperature. This change in pressure is transmitted to the respective chambers 28, 35, and 36 of the associated steam valves, to produce closing of the valve 25 and opening of the valve 26 upon rise in the dry-bulb temperature and consequent increase of pressure in the chambers 28 and 36, and closing of the valve 26 upon rise in the wet-bulb temperature and consequent increase of pressure in the chamber 35; and vice versa.

In operation, the weight 30 of the valve 25 is set to produce a closing movement of such valve when the dry-bulb temperature of the air in the drying chamber 10 exceeds the desired value, and an opening movement of such valve when such dry-bulb temperature falls below that desired value. The steam supplied through the valve 25 to the coils 13 heats the air in the drying chamber 10 and produces circulation of such air; and the dry-bulb temperature of such air in the chamber 10 is maintained constant, within the limits of sensitiveness of the valve 25 in its closing and opening movements as produced by the thermostat 40 upon the rise and fall of such dry-bulb temperature above and below the desired value.

The setting of the lever 32 with relation to the two movable members of the chambers 35 and 36 and with respect to the valve stem 31 depends on the desired relative humidity—or rather on the desired difference between the wet-bulb and dry-bulb temperatures. This setting is obtained by the lock nuts associated with said valve stem and with such movable members, and determines such difference. The desired setting having been obtained, a rise in the dry-bulb temperature of the air in the chamber 10 acts through the thermostat 42 to cause the pressure chamber 36 to expand and to overcome the action of the pressure chamber 35 on the lever 32, and thus produces an opening of the humidification valve 26 to admit more steam to the coils 15. This produces a greater heating of the water in the water troughs 15, and more evaporation therefrom, and consequently raises the wet-bulb temperature of the air in the chamber 10.

This in turn acts through the wet-bulb thermostat 41 to cause the pressure chamber 35 to expand and to overcome the action of the pressure chamber 36 on the lever 32, and thus to produce a closing of the humidification valve 26 to shut off the supply of steam to the coils 23; this shutting off of the supply of steam occurs when the wet-bulb temperature has risen until the difference between it and the dry-bulb temperature has fallen to the desired value. Upon a fall in the dry-bulb temperature of the air in the chamber 10, the reverse action takes place. Upon a variation in the wet-bulb temperature alone, without any change in the dry-bulb temperature, the variation in its effect on the pressure chamber 35 produces a closing of the humidification valve 26 and a cutting down of the supply of steam to the coils 23 when the wet-bulb temperature rises and an opening of such valve and an increase of the supply of steam to such coils when the wet-bulb temperature falls. In other words, changes in the dry-bulb temperature of the air produce corresponding changes in the amount of steam supplied through the humidification valve 26, while changes in the wet-bulb temperature of the air produce inverse changes in the amount of steam supplied through such valve; and between these things, changes in the difference between the dry-bulb and wet-bulb temperatures produce corresponding changes in the amount of steam supplied through such valve, so as to maintain such difference substantially constant. The wet-bulb temperature follows the dry-bulb temperature, at a substantially constant difference therefrom.

In consequence, if for any reason the dry-bulb temperature within the chamber 10 should depart from its desired constant value, as by failure of the valve 25 to function properly, there will be no great variation in the relative humidity of the air in such chamber, and substantially no difference (within the limits of the apparatus) in the difference between the dry-bulb and wet-bulb temperatures. Thus, if the valve 25 should be opened unduly, so as to raise the dry-bulb temperature within the chamber 10, the wet-bulb temperature will rise correspondingly, and the disastrous effects on the material within the kiln which might follow a sudden drop in the relative humidity of the air in the drying chamber are avoided. By maintaining substantially constant the difference between the dry-bulb and wet-bulb temperatures, a rise in the dry-bulb temperature produces an actual rise in the relative humidity of the air instead of a fall therein, which rise is relatively slight if such difference is small but increases as such difference increases; as is readily seen from standard psychrometric tables. This is of advantage, for by raising the relative humidity of the air as the temperature rises, should a rise in temperature occur accidentally, there is an actual cutting down of the water-removing drying in spite of the higher temperature, and the bad results which follow too rapid drying are avoided.

Thus by this arrangement of control for the valves 25 and 26, the desired dry-bulb temperature and the desired difference between the dry-bulb and wet-bulb temperatures are automatically maintained; and if by accident there should be an undue variation in the dry-bulb temperature, the wet-bulb temperature follows the dry-bulb temperature to maintain the difference substantially constant. The dry-bulb temperature and the difference between the wet-bulb and dry-bulb temperatures may be set for anything desired by changing the setting of the weight 30 and of the lock nuts associated with the valve stem 31 and with the removable members of the pressure chambers 35 and 36. In drying practice, I have found that the best results are ordinarily obtained by increasing both the dry-bulb temperature and the difference between the dry-bulb and wet-bulb temperatures within the drying temperature from time to time.

I claim as my invention:

1. A dry-kiln, comprising a drying chamber, air-heating coils, a water vessel, water-heating coils for heating the water in said vessel, dry-bulb and wet-bulb thermostats responsive to conditions within said drying chamber, means controlled by a dry-bulb thermostat for controlling the supply of heating fluid to said air-heating coils, and means operated jointly by pressures developed by a dry-bulb thermostat and a wet-bulb thermostat acting in opposition for controlling the supply of heating fluid to said water-heating coils.

2. A dry-kiln, comprising a drying chamber, air-heating coils, a water vessel, water-heating coils for heating the water in said vessel, dry-bulb and wet-bulb thermostats responsive to conditions within said drying chamber, means controlled by a dry-bulb thermostat for controlling the supply of heating fluid to said air-heating coils, and means operated jointly by pressures developed by a dry-bulb thermostat and a wet-bulb thermostat for controlling the supply of heating fluid to said water-heating coils.

3. A dry-kiln, comprising a drying chamber, means for heating said drying chamber, means for humidifying the air within said drying chamber, dry-bulb and wet-bulb thermostats responsible to the dry-bulb and the wet-bulb temperature of said drying chamber means controlled by a dry-bulb thermostat for controlling said heating means, and means operated jointly by pressures developed by a dry-bulb thermostat and a wet-bulb thermostat acting in opposition for controlling the humidifying effect of said humidifying means.

4. A dry-kiln, comprising a drying chamber, means for heating said drying chamber, means for humidifying the air within said drying chamber, dry-bulb and wet-bulb thermostats responsive to the dry-bulb and the wet-bulb temperature of said drying chamber, means controlled by a dry-bulb thermostat for controlling said heating means, and means operated jointly by pressures developed by a dry-bulb thermostat and a wet-bulb thermostat for controlling the humidifying effect of said humidifying means.

5. A dry-kiln, comprising a drying chamber, air-heating coils, a water vessel, means for heating the water in said vessel, dry-bulb and wet-bulb thermostats responsive to conditions within said drying chamber, means controlled by a dry-bulb thermostat for controlling the supply of heating fluid to said air-heating coils, and means operated jointly by pressures developed by a dry-bulb thermostat and a wet-bulb thermostat acting in opposition for controlling the heating effect of said water-heating means.

6. A dry-kiln, comprising a drying chamber, air-heating coils, a water vessel, means for heating the water in said vessel, dry-bulb and wet-bulb thermostats responsive to conditions within said drying chamber, means controlled by a dry-bulb thermostat for controlling the supply of heating fluid to said air-heating coils, and means operated jointly by pressures developed by a dry-bulb thermostat and a wet-bulb thermostat for controlling the heating effect of said water-heating means.

7. A dry-kiln, comprising a drying chamber, means for heating said drying chamber, a water vessel, means for heating the water in said vessel, dry-bulb and wet-bulb thermostats responsive to the dry-bulb and the wet-bulb temperature of said drying chamber, means controlled by a dry-bulb thermostat for controlling said heating means, and means operated jointly by pressures developed by a dry-bulb thermostat and a wet-bulb thermostat acting in oppostion for controlling the heating effect of said water-heating means.

8. A dry-kiln, comprising a drying chamber, means for heating said drying chamber, a water vessel, means for heating the water in said vessel, dry-bulb and wet-bulb thermostats responsive to the dry-bulb and the wet-bulb temperature of said drying chamber, means controlled by a dry-bulb thermostat for controlling said heating means, and means operated jointly by pressures developed by a dry-bulb thermostat and a wet-bulb thermostat for controlling the heating effect of said water-heating means.

9. A dry-kiln, comprising a drying chamber, air-heating coils, a water vessel, water-heating coils for heating the water in said vessel, dry-bulb and wet-bulb thermostats responsive to conditions within said drying chamber, means controlled by a dry-bulb thermostat for controlling the supply of heating fluid to said air-heating coils, and two devices controlled respectively by a dry-bulb thermostat and a wet-bulb thermostat and tending respectively to increase and to decrease the supply of heating fluid to said water-heating coils.

10. A dry-kiln, comprising a drying chamber, means for heating said drying chamber, means for humidifying the air within said drying chamber, dry-bulb and wet-bulb thermostats responsive to the dry-bulb and the wet-bulb temperature of said drying chamber, means controlled by a dry-bulb thermostat for controlling said heating means, and two devices controlled respectively by a dry-bulb thermostat and a wet-bulb thermostat and tending respectively to increase and to decrease the humidifying effect of said humidifying means.

11. A dry-kiln, comprising a drying chamber, air-heating coils, a water vessel, means for heating the water in said vessel, dry-bulb and wet-bulb thermostats responsive to conditions within said drying chamber, means controlled by a dry-bulb thermostat for controlling the supply of heating fluid to said air-heating coils, and two devices controlled respectively by a dry-bulb thermostat and a wet-bulb thermostat and tending respectively to increase and to decrease the heating effect of said water-heating means.

12. A dry-kiln, comprising a drying chamber, means for heating said drying chamber, a water vessel, means for heating the water in said vessel, dry-bulb and wet-bulb thermostats responsive to the dry-bulb and the wet-bulb temperature of said drying chamber, means controlled by a dry-bulb thermostat for controlling said heating means, and two devices controlled respectively by a dry-bulb thermostat and a wet-bulb thermostat and tending respectively to increase and to decrease the heating effect of said water-heating means.

13. In combination, air-heating means, air-humidifying means, said air-heating and said air-humidifying means being arranged to act on a common body of air, dry-bulb and wet-bulb thermostats controlled respectively by the dry-bulb and wet-bulb temperatures of such air, means controlled by a dry-bulb thermostat for controlling said air-heating means, and means operated jointly by pressures developed by a dry-bulb thermostat and a wet-bulb thermostat acting in opposition for controlling the humidifying effect of said air-humidifying means.

14. In combination, air-heating means, air-humidifying means, said air-heating and said air-humidifying means being arranged to act on a common body of air, dry-bulb and wet-bulb thermostats controlled respectively by the dry-bulb and wet-bulb temperatures of such air, means controlled by a dry-bulb thermostat for controlling said air-heating means, and means operated jointly by pressures developed by a dry-bulb thermostat and a wet-bulb thermostat for controlling the humidifying effect of said air-humidifying means.

15. In combination, air-heating means, air-humidifying means, said air-heating and said air-humidifying means being arranged to act on a common body of air, dry-bulb and wet-bulb thermostats controlled respectively by the dry-bulb and wet-bulb temperatures of such air, means controlled by a dry-bulb thermostat for controlling said air-heating means, and two devices controlled respectively by a dry-bulb thermostat and a wet-bulb thermostat and tending respectively to increase and to decrease the humidifying effect of said air-humidifying means.

16. In combination, air-humidifying means, a dry-bulb thermostat and a wet-bulb thermostat responsive respectively to the dry-bulb temperature and to the wet-bulb temperature of the air on which said humidifying means acts, and means operated jointly by pressures developed by said dry-bulb thermostat and said wet-bulb thermostat acting in opposition for controlling the humidifying effect of said air-humidifying means.

17. In combination, air-humidifying means, a dry-bulb thermostat and a wet-bulb thermostat responsive respectively to the dry-bulb temperature and to the wet-bulb temperature of the air on which said humidifying means acts, and means operated jointly by pressures developed by said dry-bulb thermostat and said wet-bulb thermostat for controlling the humidifying effect of said air-humidifying means.

18. In combination, air-humidifying means, a dry-bulb thermostat and a wet-bulb thermostat responsive respectively to the dry-bulb temperature and to the wet-bulb temperature of the air on which said humidifying means acts, and two devices controlled respectively by said dry-bulb thermostat and said wet-bulb thermostat and tending respectively to increase and decrease the humidifying effect of said air-humidifying means.

19. In combination, a water-containing vessel exposed to air to be humidified, means for heating the water in said vessel, a dry-bulb thermostat and a wet-bulb thermostat responsive respectively to the dry-bulb and wet-bulb temperatures of the air to which said water-containing vessel is exposed, and means controlled jointly by said dry-bulb thermostat and said wet-bulb thermostat acting in opposition for controlling the supply of heat to said water-heating means.

20. In combination, a water-containing vessel exposed to air to be humidified, means for heating the water in said vessel, a dry-bulb thermostat and a wet-bulb thermostat responsive respectively to the dry-bulb and wet-bulb temperatures of the air to which said water-containing vessel is exposed, and means controlled jointly by said dry-bulb thermostat and said wet-bulb thermostat for controlling the supply of heat to said water-heating means.

21. In combination, a water-containing vessel exposed to air to be humidified, means for heating the water in said vessel, a dry-bulb thermostat and a wet-bulb thermostat responsive respectively to the dry-bulb and wet-bulb temperatures of the air to which said water-containing vessel is exposed, and two devices controlled respectively by said dry-bulb thermostat and said wet-bulb thermostat and tending respectively to increase and to decrease the supply of heat to said water-heating means.

22. In combination, a valve for controlling the flow of fluid, a dry-bulb thermostat and a wet-bulb thermostat responsive respectively to the dry-bulb temperature and the wet-bulb temperature of a body of air, and means operated jointly by pressures developed by said two thermostats acting in opposition for controlling said valve.

23. In combination, a valve for controlling the flow of fluid, a dry-bulb thermostat and a wet-bulb thermostat responsive respectively to the dry-bulb temperature and the wet-bulb temperature of a body of air, and means operated jointly by pressures developed by said two thermostats for controlling said valve.

24. In combination, a valve for controlling the flow of fluid, a dry-bulb thermostat and a wet-bulb thermostat responsive respectively to the dry-bulb temperature and the wet-bulb temperature of a body of air, and two devices controlled respectively by said dry-bulb thermostat and said wet-bulb thermostat and tending respectively to open and close said valve.

25. In combination, a water-containing vessel exposed to air to be humidified, means for heating the water in said vessel, a dry-bulb thermostat and a wet-bulb thermostat responsive respectively to the dry-bulb and wet-bulb temperatures of the air to which said water-containing vessel is exposed, and means operated jointly by pressures developed by said dry-bulb thermostat and said wet-bulb thermostat acting in opposition for controlling the supply of heat to said water-heating means.

26. In combination, a water-containing vessel exposed to air to be humidified, means for heating the water in said vessel, a dry-bulb thermostat and a wet-bulb thermostat responsive respectively to the dry-bulb and wet-bulb temperatures of the air to which said water-containing vessel is exposed, and means operated jointly by pressures developed by said dry-bulb thermostat and said wet-bulb thermostat for controlling the supply of heat to said water-heating means.

27. In combination, a humidification-controlling member, a dry-bulb fluid-pressure thermostat and a wet-bulb fluid pressure thermostat responsive respectively to the dry-bulb and wet-bulb temperatures of a body of air, and means operated jointly by the fluid-pressures developed by said two thermostats acting in opposition for controlling said member.

28. In combination, a humidification-controlling member, a dry-bulb fluid-pressure thermostat and a wet-bulb fluid pressure thermostat responsive respectively to the dry-bulb and wet-bulb temperatures of a body of air, and means operated jointly by the fluid-pressures developed by said two thermostats for controlling said member.

29. In combination, a humidification-controlling member, a dry-bulb fluid-pressure thermostat and a wet-bulb fluid pressure thermostat responsive respectively to the dry-bulb and wet-bulb temperatures of a body of air, and two devices responsive to the fluid pressure developed by said two thermostats respectively and tending respectively to operate said member to increase and decrease the humidification.

In witness whereof, I have hereunto set my hand at Indianapolis, Indiana, this 7th day of January, A. D. one thousand nine hundred and nineteen.

ARTHUR E. KRICK.